United States Patent
Ji et al.

(10) Patent No.: US 12,333,077 B2
(45) Date of Patent: Jun. 17, 2025

(54) FLEXIBLE VIBRATION MOTOR FOR PROVIDING TACTILE FEEDBACK, TACTILE FEEDBACK SYSTEM AND ELECTRONIC DEVICE

(71) Applicant: SUN YAT-SEN UNIVERSITY, Guangdong (CN)

(72) Inventors: Xiaobin Ji, Guangdong (CN); Feifei Pan, Guangdong (CN); Wei Xu, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 0 days.

(21) Appl. No.: 18/522,329

(22) Filed: Nov. 29, 2023

(65) Prior Publication Data
US 2024/0353926 A1    Oct. 24, 2024

(30) Foreign Application Priority Data

Apr. 21, 2023 (CN) ......................... 202310433756.4
Apr. 21, 2023 (CN) ......................... 202320911400.2

(51) Int. Cl.
*G06F 3/01*    (2006.01)
(52) U.S. Cl.
CPC .................................. *G06F 3/016* (2013.01)

(58) Field of Classification Search
None
See application file for complete search history.

(56) References Cited

U.S. PATENT DOCUMENTS

| | | | |
|---|---|---|---|
| 2017/0068318 A1* | 3/2017 | McClure | G06F 3/016 |
| 2018/0239433 A1* | 8/2018 | Akabane | G06F 3/045 |
| 2018/0269807 A1* | 9/2018 | Khoshkava | G06F 3/0414 |
| 2019/0084005 A1* | 3/2019 | Tsang | H04M 1/026 |
| 2019/0084423 A1* | 3/2019 | Pankratz | B60K 35/60 |

* cited by examiner

*Primary Examiner* — Andre L Matthews
(74) *Attorney, Agent, or Firm* — Yue (Robert) Xu; Apex Attorneys at Law, LLP (57) ABSTRACT

The present disclosure relates to the technical field of tactile feedback, which discloses a flexible vibration motor for providing tactile feedback, tactile feedback systems and an electronic device. The flexible vibration motor of the present disclosure includes a passive vibration signal transmission layer; and a vibration driving layer; the passive vibration signal transmission layer and the vibration driving layer are arranged adjacent to each other in a vertical direction; the vibration driving layer comprises an electrode array; the electrode array generates an electric field when a control signal is applied to the electrode array, and the passive vibration signal transmission layer is configured to generate induced charges induced by the electric field; the passive vibration signal transmission layer is further configured to generate vibration to provide tactile feedback under an interaction of the electric field and the induced charges.

14 Claims, 6 Drawing Sheets

FLEXIBLE VIBRATION MOTOR FOR PROVIDING TACTILE FEEDBACK, TACTILE FEEDBACK SYSTEM AND ELECTRONIC DEVICE

CROSS REFERENCE OF RELATED APPLICATION

The present application claims priority to Chinese Patent Application No. 202310433756.4, titled "FLEXIBLE VIBRATION MOTOR FOR PROVIDING TACTILE FEEDBACK, TACTILE FEEDBACK SYSTEM AND ELECTRONIC DEVICE", filed on Apr. 21, 2023 and Chinese Patent Application No. 202320911400.2, titled "FLEXIBLE VIBRATION MOTOR FOR PROVIDING TACTILE FEEDBACK, TACTILE FEEDBACK SYSTEM AND ELECTRONIC DEVICE", filed on Apr. 21, 2023 with the China National Intellectual Property Administration, which are incorporated herein by reference in their entireties.

FIELD

The present disclosure relates to the technical field of tactile feedback, and in particular to a flexible vibration motor for providing tactile feedback, tactile feedback systems and an electronic device.

BACKGROUND

In conventional technology, the generation of tactile feedback is mainly based on a hard motor driving device. This type of motor driving device has disadvantages of bulky appearance, relatively simple output signal, and small vibration frequency range. In addition, the essential property of its hard material hinders the applications of flexible requirements, such as flexible/soft system integration, especially when interfacing with human skin. The non-transparent characteristic limits the integration of optical functions, making it difficult to cover on a touch screen of an electronic product in conventional technology.

In order to solve shortcomings of the vibration motor driving device in conventional technology, current relevant research mainly focuses on the development of flexible vibration motors. According to the vibration mechanism, flexible vibration motors can be basically categorized into: vibration motors driven by fluid pressure, magnet vibration motors, vibration motors based on soft material deformation, and thin-membrane vibration motors driven by electrostatic force. Where, the vibration motor driven by fluid pressure is required to use a pump or compressor to generate a fluid pressure difference, which limits the portability and quietness of the motor; the magnet vibration motor is required to operate in an environment covered by a magnetic field, which is dependent on the working environment. Soft materials include shape memory alloy/elastomer composite, shape memory polymer, and thermally deformable polymer fiber. The deformations of these soft materials are required to be driven by heating and exothermic processes, which limits the vibration frequency range of the corresponding vibration motor. Although the thin-membrane vibration motor driven by electrostatic force has advantages of high driving speed, large strain, high output power density, and ultra-thinness, it is more likely to malfunction due to dielectric breakdown and multiple wearing processes, which ends up with a short operation life.

Hence, it is necessary to provide a new flexible motor vibration mechanism to effectively expand the vibration frequency range of a flexible vibration motor and improve its usability and operation life while meeting the requirement of integrating flexible and optical functions.

SUMMARY

A flexible vibration motor for providing tactile feedback, tactile feedback systems and an electronic device are provided according to the present disclosure. The tactile feedback is provided through a new flexible motor vibration mechanism, which overcomes the problem that a conventional flexible vibration motor providing tactile feedback with a small vibration frequency range, unsatisfied human-skin-interfacing usability and short operation life.

In a first aspect of the present disclosure, a flexible vibration motor for providing tactile feedback is provided. The flexible vibration motor includes: a passive vibration signal transmission layer; and a vibration driving layer; where the passive vibration signal transmission layer and the vibration driving layer are arranged adjacent to each other in a vertical direction; the vibration driving layer includes an electrode array; where the electrode array is configured to generate an electric field when a control signal is applied to the electrode array, and the passive vibration signal transmission layer is configured to generate induced charges induced by the electric field; the passive vibration signal transmission layer is further configured to generate vibration to provide tactile feedback under an interaction of the electric field and the induced charges.

According to an implementation of the first aspect of the present disclosure, the vibration driving layer further includes an electrode isolation layer, and the electrode array is encapsulated in the electrode isolation layer.

According to an implementation of the first aspect of the present disclosure, the electrode array is composed of multiple electrodes with a same interval; or the electrode array is composed of an interdigitated electrode, where the interdigitated electrode includes two single-sided electrodes with multiple conductive finger strips, and the conductive finger strips of the two single-sided electrodes are alternately arranged.

According to an implementation of the first aspect of the present disclosure, the flexible vibration motor further includes an encapsulation isolation part; where a gas space is formed between the encapsulation isolation part and the passive vibration signal transmission layer, and the vibration driving layer is located in the gas space.

According to an implementation of the first aspect of the present disclosure, the gas space is filled with gas.

According to an implementation of the first aspect of the present disclosure, the encapsulation isolation part includes an encapsulation layer and two isolation spacing units; for each isolation spacing unit, one terminal of the isolation spacing unit is connected to the encapsulation layer, and another terminal of the isolation spacing unit is connected to the passive vibration signal transmission layer.

According to an implementation of the first aspect of the present disclosure, the flexible vibration motor is configured as a transparent thin-film structure.

A second aspect of the present disclosure, a tactile feedback system is provided, the tactile feedback system includes multiple flexible vibration motors for providing tactile feedback as described in any one of the above implementations, and the flexible vibration motors is arranged in an array according to a preset rule.

A third aspect of the present disclosure, a tactile feedback system is provided, the tactile feedback system includes a flexible vibration motor for providing tactile feedback as described in any one of the above implementations, which further includes a controller; and the controller is connected to the electrode array and is configured to apply a control signal to the electrode array.

A fourth aspect of the present disclosure, an electronic device is provided, which includes the tactile feedback system as described above.

BRIEF DESCRIPTION OF THE DRAWINGS

In order to more clarify technical solutions in the embodiments of the present disclosure or in the conventional technology, the drawings used in the description of the embodiments or the conventional technology are briefly introduced below. It is apparent that the drawings in the following description are only some embodiments of the present disclosure. For those ordinary skilled in the art, other drawings can be obtained based on these drawings without exerting creative efforts.

REFERENCE SIGNS 1 passive vibration signal transmission layer; 2 vibration driving layer; 3 encapsulation isolation part; 4 gas space; 5 finger; 21 electrode array; 22 electrode isolation layer; 31 encapsulation layer; 32 isolation spacing unit.

DETAILED DESCRIPTION

According to embodiments of the present disclosure, a flexible vibration motor for providing tactile feedback, a tactile feedback system and an electronic device are provided, which overcomes the problem that a conventional flexible vibration motor providing tactile feedback with the small vibration frequency range, unsatisfied human-skin-interfacing usability and short operation life.

In order to make the purpose, features, and advantages of the present disclosure more clear and easy to understand, the technical solutions in the embodiments of the present disclosure will be clearly and completely described below in conjunction with accompanying drawings in the embodiments of the present disclosure. Apparently, the described embodiments below are only some of the embodiments of the present disclosure, rather than all of them. Based on the embodiments of the present disclosure, all other embodiments obtained by those of ordinary skilled in the art without creative efforts fall within the scope of protection of the present disclosure.

The present disclosure provides a flexible vibration motor for providing tactile feedback.

Figure 1:
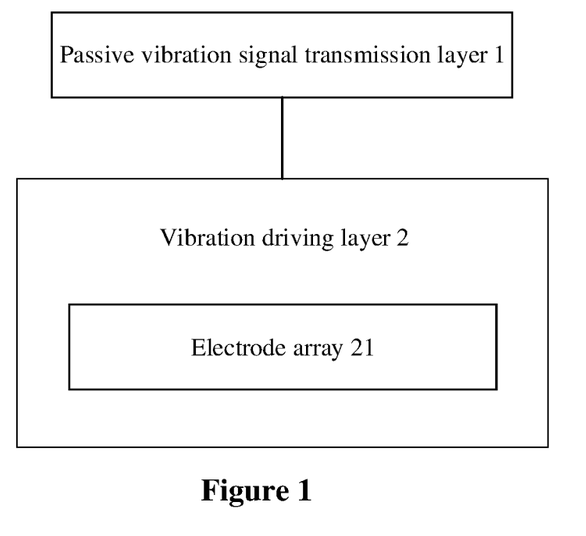
FIG. 1 is a structural connection block diagram of a flexible vibration motor for providing tactile feedback according to an embodiment of the present disclosure.

Referring to FIG. 1, FIG. 1 shows a structural connection block diagram of a flexible vibration motor for providing tactile feedback according to an embodiment of the present disclosure.

According to an embodiment of the present disclosure, a flexible vibration motor providing tactile feedback is provided, which includes a passive vibration signal transmission layer 1 and a vibration driving layer 2.

The passive vibration signal transmission layer 1 and the vibration driving layer 2 are arranged adjacent to each other in a vertical direction, e.g., in an up and down direction.

The vibration driving layer 2 includes an electrode array 21.

When a control signal is applied to the electrode array 21, an electric field is generated, inducing the passive vibration signal transmission layer 1 to generate induced charges. The passive vibration signal transmission layer 1 generates vibration under an interaction of the electric field and the induced charges to provide tactile feedback.

In one embodiment of the present disclosure, a new motor vibration mechanism is innovatively used, that is, an electric field distribution is controlled by the electrode array 21 arranged in the vibration driving layer 2, thereby inducing the adjacent passive vibration signal transmission layer 1 to generate induced charges to interact with the vibration driving layer 2, causing contact vibration. Compared with the conventional vibration motor, the provided motor vibration mechanism expands the vibration frequency range of the vibration motor by at least one order of magnitude, allowing the vibration frequency of the vibration motor of the present disclosure to be up to 1000 Hz. In addition, the conventional vibration motors are all hard metal devices without flexible function. In comparison, the passive vibration signal transmission layer 1 and the vibration driving layer 2 in the present disclosure are configured in a layered structure, which can be manufactured by using thin-film materials such as polyethylene terephthalate (PET), so that the flexible vibration motor of the present disclosure can still maintain the vibration function under the state of bending, twisting and other deformations, which can meet the requirement of integrating flexibility and optical functions. Further, the flexible vibration motor of the present disclosure is of a simple structure and is easy to manufacture, which can be manufactured using flexible thin-film materials with a low cost. In this way, it has low-cost advantage. In addition, by applying control signals in different intensities, the passive vibration signal transmission layer 1 can provide tactile feedback signals in multiple vibration modes, which has excellent usability. Although the flexible vibration motor of the present disclosure may be broken down temporarily in a case that an overranged control signal is applied, it can continue to be used when the amplitude of the control signal is reduced below a safe value, which significantly increases the operation life.

It should be noted that the above control signal can be applied by a conventional commercial signal generating device, which is not limited in this embodiment. As a specific implementation, the electrode array 21 may be connected to the conventional commercial signal generating device through wires, and a guide encapsulation hole may be provided on the vibration driving layer 2 to lead out the wires.

In an implementation, the flexible vibration motor is configured as a transparent film structure as a whole. In an embodiment, each component of the vibration motor in the present disclosure may be made of transparent materials, thereby making them optically transparent. In a case that wrapping a tactile feedback screen on the surface of other objects, such as a mobile phone screen. In this way, such tactile feedback screen provides the integrated function of generating tactile feedback for the user on the mobile phone screen without preventing the user from viewing the mobile phone screen. As a result, the dimension of tactile interaction between the user and the mobile phone is increased on the basis of vision and hearing there between.

Figure 2:
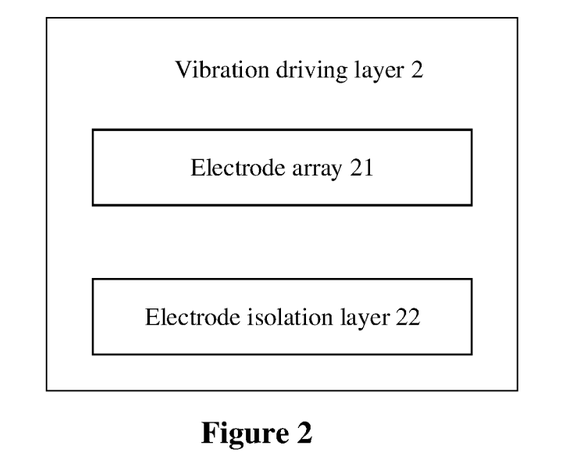
FIG. 2 is a structural connection block diagram of a vibration driving layer according to an embodiment of the present disclosure.

In an implementation, as shown in FIG. 2, the vibration driving layer 2 further includes an electrode isolation layer 22, and the electrode array 21 is encapsulated in the electrode isolation layer 22.

In an implementation, the electrode array 21 is composed of multiple electrodes with same intervals.

In the embodiment of the present disclosure, in a case that a control signal is applied to the electrode array 21, an electric field can be generated between two adjacent electrodes, thereby inducing the passive vibration signal transmission layer 1 to generate induced charges.

In an implementation, the electrode array 21 is composed of an interdigitated electrode. The interdigitated electrode includes two single-sided electrodes with multiple conductive finger strips, the conductive finger strips of the two single-sided electrodes are alternately arranged.

In the embodiment of the present disclosure, in a case that a control signal is applied to the electrode array 21, an electric field can be generated between adjacent conductive finger strips, thereby inducing the passive vibration signal transmission layer 1 to generate induced charges.

Where, the conductive finger strips are made of conductive materials. As an embodiment, the conductive finger strips are metal finger strips.

Figure 3:
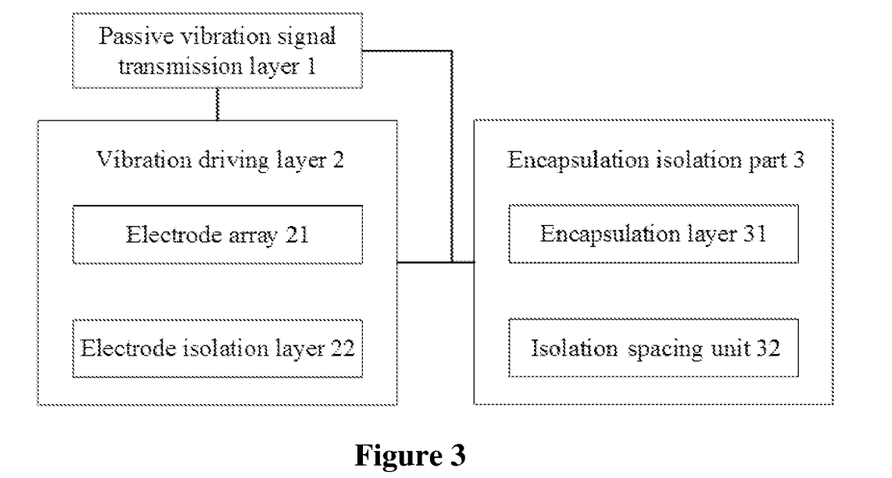
FIG. 3 is a structural connection block diagram of a flexible vibration motor for providing tactile feedback according to another embodiment of the present disclosure.
Figure 4:
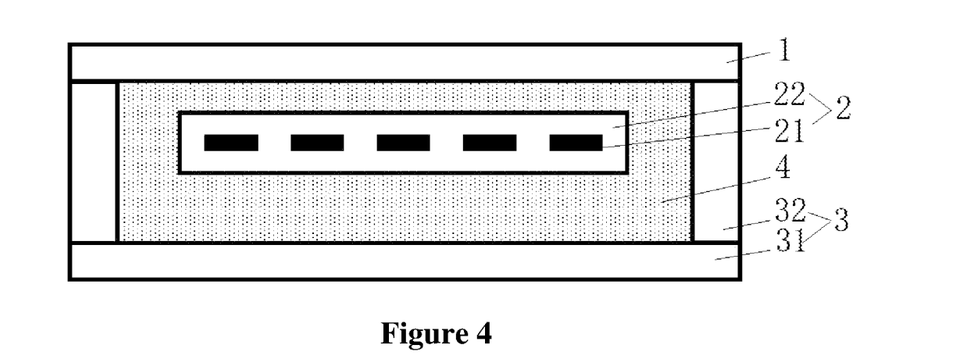
FIG. 4 is a schematic longitudinal cross-sectional view of a flexible vibration motor for providing tactile feedback shown in FIG. 3 according to an embodiment of the present disclosure.

In an implementation, as shown in FIGS. 3 and 4, the flexible vibration motor further includes an encapsulation isolation part 3, where a gas space 4 is formed between the encapsulation isolation part 3 and the passive vibration signal transmission layer 1. The vibration driving layer 2 is located in the gas space 4.

In the embodiment of the present disclosure, by providing the encapsulating isolation part 3, a vibration space of the vibration driving layer 2 can be effectively encapsulated.

In an embodiment, the encapsulation isolation part 3 includes an encapsulation layer 31 and two isolation spacing units 32. For each isolation spacing unit, one terminal of the isolation spacing unit 32 is connected to the encapsulation layer 31, and another terminal of the isolation spacing unit 32 is connected to the passive vibration signal transmission layer 1.

It should be noted that, in other embodiments, the encapsulation isolation part 3 may also directly be an encapsulation isolation layer with a groove. After the encapsulation isolation layer is connected to the passive vibration signal transmission layer 1, the groove forms the gas space 4.

In an implementation, the gas space 4 is filled with gas to improve the performance of the flexible vibration motor.

As an embodiment, the gas is inert gas.

In order to explain the motor vibration mechanism of the present disclosure in more detail, as an example, the flexible vibration motor shown in FIG. 4 is described below to illustrate the motor vibration mechanism and effects.

Figure 5:
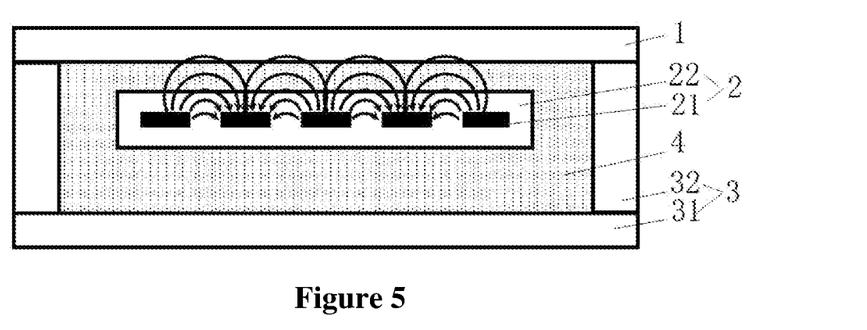
FIG. 5 is a schematic diagram of a controllable electric field distribution in a vibration driving layer after applying a control signal to an electrode array according to an embodiment of the present disclosure.
Figure 6:
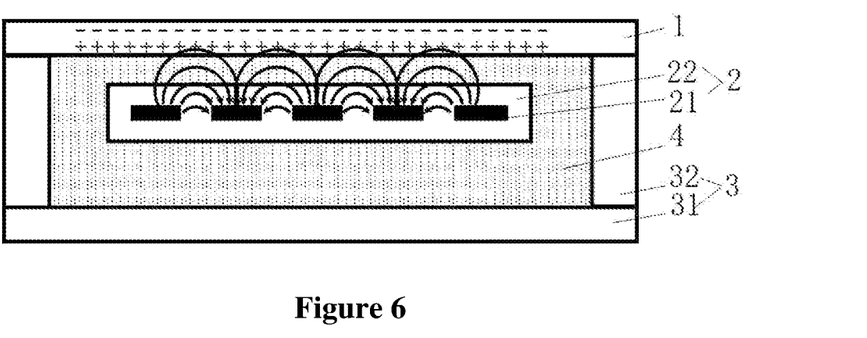
FIG. 6 is a schematic diagram of an electric field distribution of a vibration driving layer inducing a passive vibration signal transmission layer to generate induced charges according to an embodiment of the present disclosure.
Figure 7:
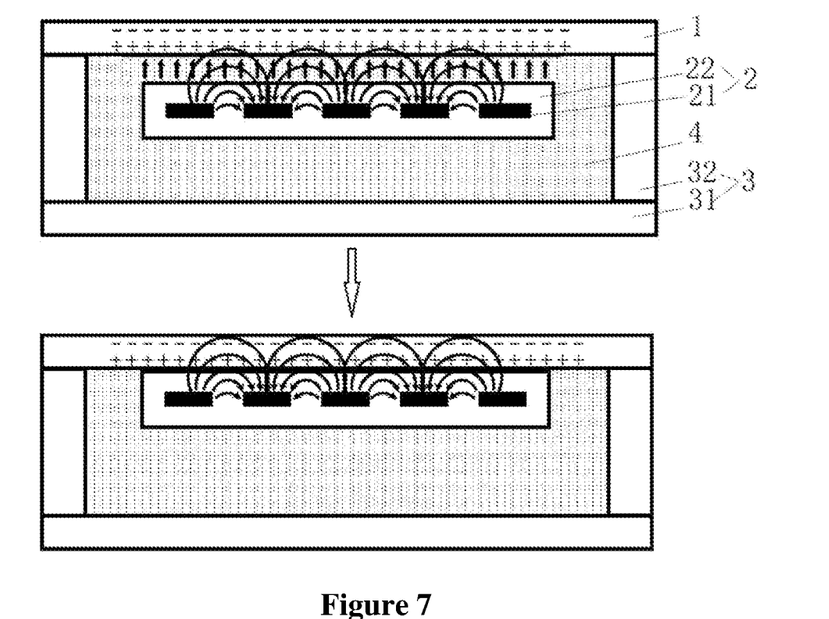
FIG. 7 is a schematic diagram of a vibration driving layer moving upward and contacts a passive vibration signal transmission layer under interaction force between an electric field and induced charges causes according to an embodiment of the present disclosure.
Figure 8:
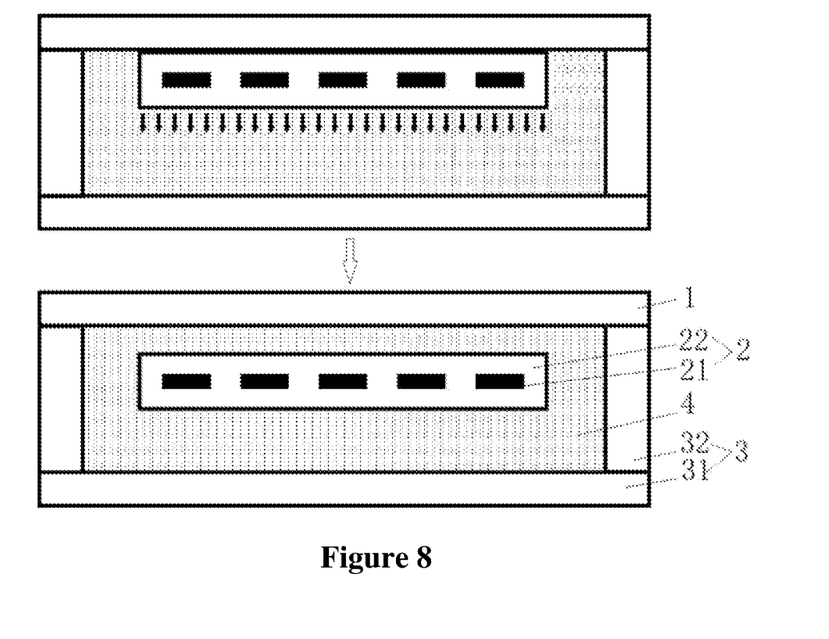
FIG. 8 is a schematic diagram of a vibration driving layer moving downward and returning to an initial equilibrium state in a case that interaction force between an electric field and induced charges disappears according to an embodiment of the present disclosure.
Figure 9:
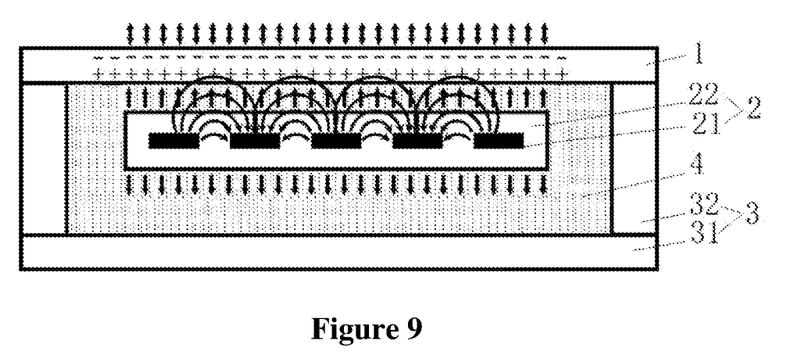
FIG. 9 is a schematic diagram of a passive vibration signal transmission layer generating periodic vibration driven by up and down reciprocating motions of a vibration driving layer according to an embodiment of the present disclosure.
Figure 10:
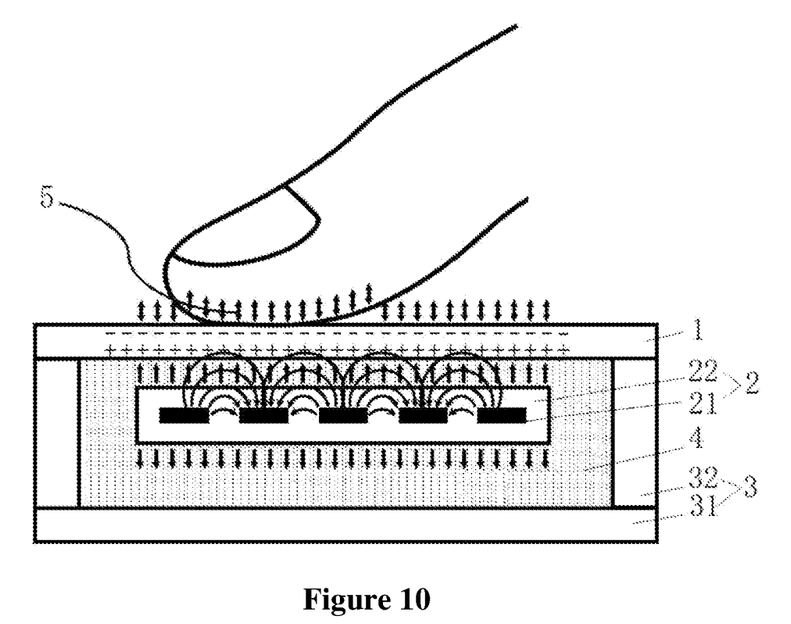
FIG. 10 is a schematic diagram showing that when a finger of a user contacts a flexible vibration motor, a corresponding vibration mode of a passive vibration signal transmission layer is transmitted to the finger skin, to cause the user to perceive tactile feedback according to an embodiment of the present disclosure.

By applying a control signal between adjacent electrodes of the electrode array 21, an electric field distribution is generated between the adjacent electrodes, as shown in FIG. 5. The electric field distribution generated can induce the passive vibration signal transmission layer 1 to generate induced charge distribution, as shown in FIG. 6. The vibration driving layer 2 moves toward the passive vibration signal transmission layer 1 through the interaction between the induced charges and the electric field and is in contact with the passive vibration signal transmission layer 1, as shown in FIG. 7. In a case that the amplitude of the control signal applied to the vibration driving layer 2 is 0, the induced charges disappear, and the vibration driving layer 2 moves downward to return to an initial state position, as shown in FIG. 8. By changing the control signal of the vibration driving layer 2, the vibration mode of the passive vibration signal transmission layer 1 may be controlled to change the amplitude and frequency of the passive vibration signal transmission layer 1, as shown in FIG. 9, the up and down reciprocating motion of the vibration driving layer 2 drives the passive vibration signal transmission layer 1 to generate periodic vibrations. When a finger contacts the passive vibration signal transmission layer 1, as shown in FIG. 10, the vibration mode of the passive vibration signal transmission layer 1 is transmitted to the skin of the finger 5, to cause the user who is contacting it to perceive tactile feedback. By changing the control signal applied to the vibration driving layer 2 in the range of 1-1000 Hz, the user can sense multiple modes of tactile feedback signals.

Figure 11:
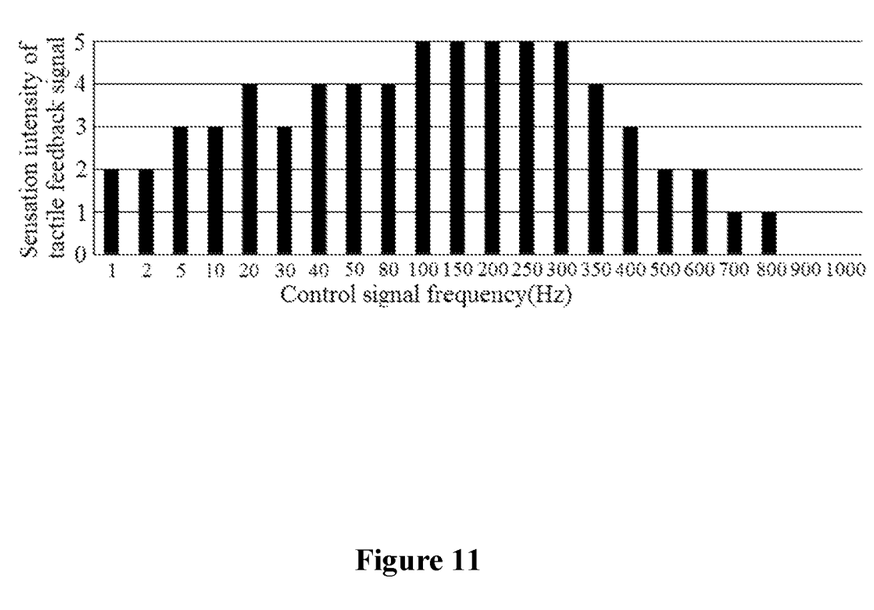
FIG. 11 is a diagram of a relationship between a tactile feedback signal sensation intensity and a control signal according to an embodiment of the present disclosure.

In order to verify the function of the flexible vibration motor providing tactile feedback in the present disclosure, the inventor applied a control signal to the electrode array 21 of the flexible vibration motor of the present disclosure, gradually adjusted the frequency of the control signal applied in the range of 1-1000 Kz, and recorded the tactile feedback signal intensity of the user at each frequency. The tactile feedback signal intensity sensed by the user is measured on a scale of 0 to 5. The relationship between the tactile feedback signal intensity sensed by the user and the control signal obtained from this experiment is shown in FIG. 11. Where, "0" represents the user is unable to sense the tactile feedback signal at all; "1" represents the user can barely sense it; "2" represents the user is able to sense it; "3"

represents the user can easily sense it; "4" represents the user senses it relatively strong; "5" represents the user senses it intensively.

The experiment has found that as the frequency of the control signal increases, the tactile feedback signal sensed by the user increases, reaching the strongest area around 100 Hz to 300 Hz. After that, the sensation intensity of the tactile feedback signal decreases as the control frequency increases, the feeling intensity of the tactile feedback signal weakens to "0" at about 900 to 1000 Hz. The sensation intensity of the tactile feedback signal can reflect the performance of the vibration motor of the present disclosure as a tactile feedback device, but it cannot completely reflect the vibration condition of the device. For example, the sensation intensity of the tactile feedback signal corresponding to different control signals may be equal, but the vibration modes may be different. For example, the sensation intensities of the tactile feedback signal corresponding to 5 Hz and 400 Hz are both "4", but the vibration mode may show obvious differences. The vibration mode corresponding to the control signal of 5 Hz is tapping, while the vibration mode corresponding to the 400 Hz control signal is vibration. In addition, the tactile receptors in human skin have a limited sensing range. For example, in a case that the control frequency is 1000 Hz in the experiment, the experimenter can slightly hear the sound produced by the vibration of the device corresponding to 1000 Hz, but the skin cannot sense the vibratory tactile feedback corresponding to 1000 Hz.

The control signal amplitude used in this experimental sample is 1 kV, and the corresponding sensation intensity of the tactile feedback signal may also be achieved by adjusting the amplitude of the control signal. However, the amplitude intensity is limited by device design parameters and material characteristics. In a case that it is too high, it will cause electrical breakdown of the device. However, it was found in experiments that the electrical breakdown corresponding to the flexible vibration motor of the present disclosure is temporary. In the experiment, a voltage (2 kV) higher than twice its operation voltage was applied to the flexible vibration motor of the present disclosure. After powering on, the flexible vibration motor of the present disclosure was broken down immediately. However, after the voltage is reduced to 1 kV, the flexible vibration motor of the present disclosure regains its operation capability. Electrical breakdown only causes temporary failure of the flexible vibration motor of the present disclosure, rather than permanent failure. The very same flexible vibration motor that is electrically broken down can continue to maintain its operation capability after the control signal returns to the operation voltage. This characteristic can significantly enhance the fault tolerance, robustness and operation life of the device.

A tactile feedback system is further provided according to the present disclosure. The tactile feedback system includes multiple flexible vibration motors for providing tactile feedback as described in any one of the above implementations, and the flexible vibration motors are arranged in an array according to a preset configuration.

A tactile feedback system is further provided according to the present disclosure. The tactile feedback system includes a flexible vibration motor for providing tactile feedback as described in any one of the above implementations. The system further includes a control unit. The control unit is connected to the electrode array 21 and is configured to apply a control signal to the electrode array 21. In an embodiment, the control unit may be a controller, which is not limited in the present disclosure.

An electronic device is further provided according to the present disclosure, which includes the tactile feedback system as described above.

As mentioned above, the above embodiments are only used to illustrate the technical solutions of the present disclosure, rather than a limitation on the present disclosure. Although the present disclosure has been described in detail with reference to the foregoing embodiments, those of ordinary skilled in the art should understand that they may still modify the technical solutions described in each of the above embodiments or equivalently replace some of the technical features. Nevertheless, these modifications or substitutions do not cause the essence of the corresponding technical solutions to deviate from the spirit and scope of the technical solutions of the embodiments of the present disclosure.

The invention claimed is:

1. A flexible vibration motor for providing tactile feedback, comprising:
   a passive vibration signal transmission layer; and
   a vibration driving layer, comprising an electrode array; wherein
   the passive vibration signal transmission layer and the vibration driving layer are arranged adjacent to each other in a vertical direction;
   the electrode array is configured to generate an electric field when a control signal is applied to the electrode array;
   the passive vibration signal transmission layer is configured to generate induced charges induced by the electric field; and the passive vibration signal transmission layer is further configured to generate vibration to provide tactile feedback under an interaction of the electric field and the induced charges; and
   wherein the flexible vibration motor for providing tactile feedback further comprising:
   an encapsulation isolation part;
   wherein a gas space is formed between the encapsulation isolation part and the passive vibration signal transmission layer, and the vibration driving layer is located in the gas space.

2. The flexible vibration motor for providing tactile feedback according to claim 1, wherein the vibration driving layer further comprises an electrode isolation layer, and the electrode array is encapsulated in the electrode isolation layer.

3. The flexible vibration motor for providing tactile feedback according to claim 1, wherein the electrode array is composed of a plurality of electrodes with a same interval; or
   the electrode array is composed of an interdigitated electrode, wherein the interdigitated electrode comprises two single-sided electrodes with a plurality of conductive finger strips, and the conductive finger strips of the two single-sided electrodes are alternately arranged.

4. The flexible vibration motor for providing tactile feedback according to claim 1, wherein the gas space is filled with gas.

5. The flexible vibration motor for providing tactile feedback according to claim 1, wherein the encapsulation isolation part comprises an encapsulation layer and two isolation spacing units;
   for each isolation spacing unit, one terminal of the isolation interval unit is connected to the encapsulation layer, and another terminal of the isolation spacing unit is connected to the passive vibration signal transmission layer.

6. The flexible vibration motor for providing tactile feedback according to claim 1, wherein the flexible vibration motor is configured as a transparent thin-film structure.

7. A tactile feedback system, comprising a plurality of the flexible vibration motors for providing tactile feedback according to claim 1, and the plurality of flexible vibration motors are arranged in an array according to a preset rule.

8. A tactile feedback system, comprising:
a flexible vibration motor for providing tactile feedback; and
a controller; wherein
the flexible vibration motor for providing tactile feedback comprises:
a passive vibration signal transmission layer; and
a vibration driving layer, comprising an electrode array; wherein
the passive vibration signal transmission layer and the vibration driving layer are arranged adjacent to each other in a vertical direction;
the electrode array is configured to generate an electric field when a control signal is applied to the electrode array;
the passive vibration signal transmission layer is configured to generate induced charges induced by the electric field; and the passive vibration signal transmission layer is further configured to generate vibration to provide tactile feedback under an interaction of the electric field and the induced charges;
the controller is connected to the electrode array and configured to apply a control signal to the electrode array; and
wherein the tactile feedback system further comprising:
an encapsulation isolation part;
wherein a gas space is formed between the encapsulation isolation part and the passive vibration signal transmission layer, and the vibration driving layer is located in the gas space.

9. The tactile feedback system according to claim 8, wherein the vibration driving layer further comprises an electrode isolation layer, and the electrode array is encapsulated in the electrode isolation layer.

10. The tactile feedback system according to claim 8, wherein the electrode array is composed of a plurality of electrodes with a same interval; or
the electrode array is composed of an interdigitated electrode, wherein the interdigitated electrode comprises two single-sided electrodes with a plurality of conductive finger strips, and the conductive finger strips of the two single-sided electrodes are alternately arranged.

11. The tactile feedback system according to claim 8, wherein the gas space is filled with gas.

12. The tactile feedback system according to claim 8, wherein the encapsulation isolation part comprises an encapsulation layer and two isolation spacing units;
for each isolation spacing unit, one terminal of the isolation interval unit is connected to the encapsulation layer, and another terminal of the isolation spacing unit is connected to the passive vibration signal transmission layer.

13. The tactile feedback system according to claim 8, wherein the flexible vibration motor is configured as a transparent thin-film structure.

14. An electronic device, comprising a tactile feedback system, the tactile feedback system comprises: a flexible vibration motor for providing tactile feedback; and a controller; wherein
the flexible vibration motor for providing tactile feedback comprises:
a passive vibration signal transmission layer; and
a vibration driving layer, comprising an electrode array; wherein
the passive vibration signal transmission layer and the vibration driving layer are arranged adjacent to each other in a vertical direction;
the electrode array is configured to generate an electric field when a control signal is applied to the electrode array;
the passive vibration signal transmission layer is configured to generate induced charges induced by the electric field; and the passive vibration signal transmission layer is further configured to generate vibration to provide tactile feedback under an interaction of the electric field and the induced charges;
the controller is connected to the electrode array and configured to apply a control signal to the electrode array; and
wherein the tactile feedback system further comprising:
an encapsulation isolation part;
wherein a gas space is formed between the encapsulation isolation part and the passive vibration signal transmission layer, and the vibration driving layer is located in the gas space.

* * * * *